J. MEANS.
AERIAL NAVIGATION.
APPLICATION FILED MAR. 2, 1908.
989,022.
Patented Apr. 11, 1911.
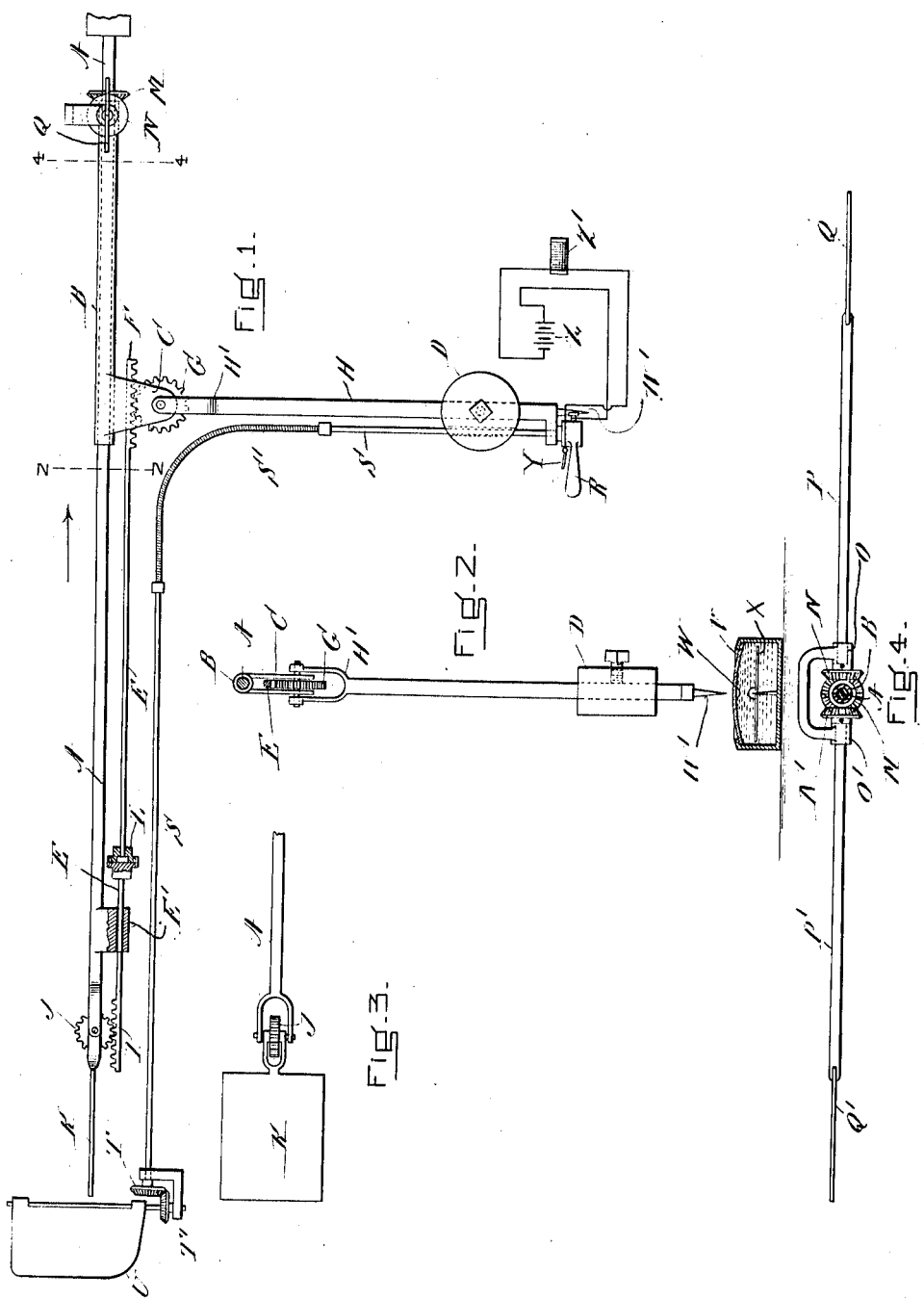
WITNESSES:
Geo. K. Woodworth.
E. B. Tomlinson.
INVENTOR:
James Means

UNITED STATES PATENT OFFICE.

JAMES MEANS, OF BOSTON, MASSACHUSETTS.

AERIAL NAVIGATION.

989,022.

Specification of Letters Patent. Patented Apr. 11, 1911.

Application filed March 2, 1908. Serial No. 418,679.

*To all whom it may concern:*

Be it known that I, JAMES MEANS, a citizen of the United States, and a resident of Boston, in the county of Suffolk and State of Massachusetts, have invented a new and useful Improvement in Aerial Navigation, of which the following is a specification.

My invention relates to aerial navigation, and more especially to controlling-apparatus for flying-machines.

The object of my invention is to provide certain improvements in devices for operating a flying machine, to be hereinafter more fully set forth.

The drawings which accompany and form a part of this specification illustrate one embodiment of my invention; and it will be understood that the particular embodiment of my invention selected for more fully disclosing the principle thereof may be subjected to a wide range of variation by those skilled in the art without departing from the spirit of my invention.

In the drawings, Figure 1 is a side elevation of my improved controlling-apparatus. Fig. 2 is a section taken on the line 2—2 of Fig. 1. Fig. 3 is a fragmentary plan view. Fig. 4 is a section taken on the line 4 4 of Fig. 1.

In the figures, A is a rod or tube secured in any suitable manner to the frame of a flying machine and placed parallel to the direction of flight indicated by the arrow. Pivoted to the fork C, integral with the tube B, which surrounds the rod A, is a pendulum H having a vertically adjustable bob D of any suitable construction, such as a weight, as shown, or a seat or other means adapted to carry the operator of a flying machine.

The rod E, which is slidable in the guide E', secured to any suitable part of the machine, such as the rod A, is operatively connected with the pendulum H and longitudinal rudder K. In that particular form of my invention shown in the drawings, the rod E is provided with racks I and F, which coöperate respectively with the gear J, rigidly secured to the rudder K, and the gear G, rigidly secured to the fork H' of the pendulum H and pivoted in the fork C. As shown, the rod E may be divided into two parts connected by the loose coupling L.

The lateral rudders Q Q' are arranged to be actuated by the rotary movement of the tube B and in the present instance I have shown said rudders secured to the ends of the rods P P', which are rigidly connected respectively with the beveled gears N N' intermeshing with the beveled gear M, which is rigidly connected with the tube B. At their inner ends the rods P P' may, as shown, be journaled in the bearings O O'.

U is a vertical rudder for directing the movements of the machine to port and starboard. The rudder U may be actuated by the lever R which preferably, as shown, is mounted on the pendulum H and may be connected with the rudder U through the rod S, a portion of which as shown at S' is flexible, and the beveled gears T T', or in any other suitable manner.

If the flying-machine is motor-propelled, the motor may be controlled by the thumb-switch Y which may be mounted on the lever R and arranged to close the circuit of the battery Z through the spark-coil Z' of the motor or through other suitable electro-responsive device.

Coöperating with the pendulum H and placed with its center directly underneath the pointer W' thereof, I may employ the spherical level V so arranged that its bubble W normally assumes a position directly under said pointer. A mariner's compass X may be mounted in said level.

The operation is as follows: Assuming the wholly automatic operation of the controlling means by the pendulum, it will be apparent that the downward movement of the forward part of the machine will cause the pendulum to swing forward thereby producing a clockwise rotation of the rudder K upon its axis and thereby steering the machine into a horizontal course. In like manner, a downward movement of the backward end of the machine will produce a counter clockwise rotation of the rudder K upon its axis so that said rudder will receive the greatest air pressure on its under side, thereby steering the machine into a horizontal course. If the lateral stability of the machine is disturbed, the pendulum H will swing transversely to the direction of flight of the machine and the tube B will make a partial revolution about the rod A, thereby turning the rudders Q Q' in opposite directions and correcting such disturbance in lateral stability. For example, assuming that the starboard side of the machine is depressed, it will be evident that the pendulum will move to the right (with respect to the operator facing the direction of flight) and that the gear M will be rotated in a counter-clockwise direction, so that through the intermediary of the gears N and N' respectively, the lateral rudders Q and Q' will be rotated about their axes in opposite directions and the rudder Q on the starboard side of the machine will receive the greatest pressure of air on its under side, while the rudder Q' on the port side will receive the greatest pressure of air upon its upper side, thereby restoring the machine to its original position of lateral horizontality. In like manner, if the port side of the machine be depressed, the rotation of the lateral rudders Q and Q' respectively will be opposite to that which takes place when the machine tips to starboard, so that the port rudder will receive the greatest pressure of air upon its upper side, thereby starboard rudder will receive the greatest pressure of air upon its upper side, thereby restoring the machine to its original position. If the lateral and horizontal stability of the machine are simultaneously disturbed, the pendulum will take a position which will cause all three rudders K, Q and Q' to perform their functions simultaneously, thereby restoring the machine to horizontal position.

As above stated, the bob D may be so constructed as to form a seat or reclining couch for the operator, in which case the latter, by restraining, augmenting, or correcting the natural movement of the pendulum by grasping some adjacent stationary portion of the machine, may control or correct disturbances in the stability thereof.

The pendulum bob may be omitted, in which case the operator will use the rod H as a lever, preferably controlling the movements thereof by grasping the handle R, to control the positions of the three rudders, he being guided by the movements of the bubble W and still having one hand free to devote to his motor. It will be evident that while the machine is in a horizontal position, the bubble W of the spherical level will be immediately under the center of the spherical surface of its containing case, and that the pointer W' of the pendulum will be directly above the center of said spherical surface. When the position of the machine is shifted from the horizontal, the bubble and the pointer will both move away from the center of the spherical surface in opposite directions.

My controlling apparatus may be used partially automatically to control the stability of a flying-machine, in which case the pendulum bob may be constructed to have just sufficient weight to make the necessary motion, and the operator, profiting by the indication made by the pendulum, will check any tendency to erratic movement. When used in this manner, or when the bob is removed and the rod H employed as a lever, the operator is enabled to correct disturbances in the lateral or longitudinal stability of the machine, or both, and at the same time actuate the vertical rudder U for right and left steering by suitably moving the handle R to the right and left with respect to the rod H and by suitably moving said rod by means of said handle which is mounted therein; and control the ignition of his motor to start or stop the same by the thumb-switch Y.

It will be noted that the longitudinal rudder or rudders K, the lateral rudders Q Q' and the vertical rudder U are mutually independently operable and that the longitudinal and lateral rudders notwithstanding such independence of operation are capable of simultaneous actuation for the purpose of correcting simultaneously-occurring disturbances in the longitudinal and lateral stability of the flying machine. It is important and advantageous to so construct, position, and arrange the longitudinal and lateral rudders that the former shall perform solely the function of correcting disturbances in the longitudinal stability of the machine, and the latter shall perform solely the function of correcting disturbances in the lateral stability of the machine, because, when they are so constructed, positioned, and arranged, it will be possible to simultaneously actuate said longitudinal and lateral rudders for simultaneously performing both functions. In the operation of a flying machine there is not necessarily any interdependence between the actuation of the vertical rudder U, on the one hand, and the longitudinal and lateral rudders K Q and Q', on the other hand.

By the term "longitudinal" as applied to a rudder, I desire to be understood as meaning a rudder so positioned and arranged that the operation thereof will correct disturbances only in the longitudinal stability of the flying machine. By the term "lateral" as applied to rudders, such as the rudders Q Q', I desire to be understood as meaning rudders so positioned and arranged that the operation thereof will correct disturbances only in the lateral stability of the machine.

Although I have shown in the accompanying drawings only one longitudinal rudder K, it will be understood of course that two may be employed, one at each end of the machine, and, further, that if one only be employed, it may be located at the front end of the machine instead of at the rear end as shown. The longitudinal and lateral rudders may be of any suitable size and construction and may be positioned with respect to the frame of the machine as desired, although I prefer to place the lateral rudders Q and Q' relatively to the machine in locations approximately represented by the locations of the tips of the wings of a soaring bird relatively to the bird.

It has been proposed to maintain the longitudinal and lateral stability of a flying machine by sets of pivoted or rotatable rudders operated automatically by a pendulum or manually by means of a lever or levers. In cases where such pivoted rudders have been used there has been no mutual independence of operation between the rudders for correcting disturbances in the longitudinal stability of the machine and the rudders for correcting disturbances in the lateral stability, that is to say, in the cases where the longitudinal rudders are movable independently of the lateral rudders, the lateral rudders cannot be moved without moving the longitudinal rudders and vice versa. It has also been proposed to correct disturbances in the lateral stability of a flying machine by twisting or deforming the surfaces of non-articulated wings and to correct for longitudinal stability by means of a pivoted rudder, these devices being operated by the same hand-lever, and there being mutual independence of operation between said wings and said rudders. In my improved apparatus the longitudinal and lateral rudders are pivoted or articulated to the machine and by my invention the said pivoted longitudinal rudder or rudders may be actuated independently of the lateral rudders and vice versa or both sets of rudders can be actuated simultaneously. This can be done either manually or automatically.

I claim:

1. In a flying machine, the combination with independently operable lateral and longitudinal rudders, of a vertical rudder, a single manually operated means for simultaneously actuating said lateral and longitudinal rudders to correct disturbances of the lateral and of the longitudinal stability of said machine, and a controlling device for said vertical rudder mounted on said manually operated means.

2. In a flying machine, the combination with mutually independently operable lateral and longitudinal pivoted rudders, of a pendulum for simultaneously actuating said rudders to correct disturbances of the lateral and of the longitudinal stability of said machine, a vertical rudder and manually operated means for actuating the same.

3. In a flying machine, the combination with lateral and longitudinal rudders, of a vertical rudder, a pendulum for simultaneously actuating said lateral and longitudinal rudders to correct disturbances of the lateral and longitudinal stability of said machine, and operating means for said vertical rudder mounted on said pendulum.

4. In a flying machine, the combination with independently operable lateral and longitudinal rudders, of a single lever for operating the same simultaneously, a vertical rudder and a controlling device for said vertical rudder mounted on said lever.

5. In a flying machine, the combination with independently operable lateral and longitudinal rudders, of a pendulum for operating the same simultaneously, a vertical rudder and a controlling device therefor mounted on said pendulum.

6. In a flying machine, the combination with independently operable lateral and longitudinal rudders, of a single lever for operating the same simultaneously, a vertical rudder and a handle mounted on said lever and operatively connected with said vertical rudder.

In testimony whereof, I have hereunto subscribed my name this 29th day of February, 1908.

JAMES MEANS.

Witnesses:
 GEO. K. WOODWORTH,
 E. B. TOMLINSON.